UNITED STATES PATENT OFFICE.

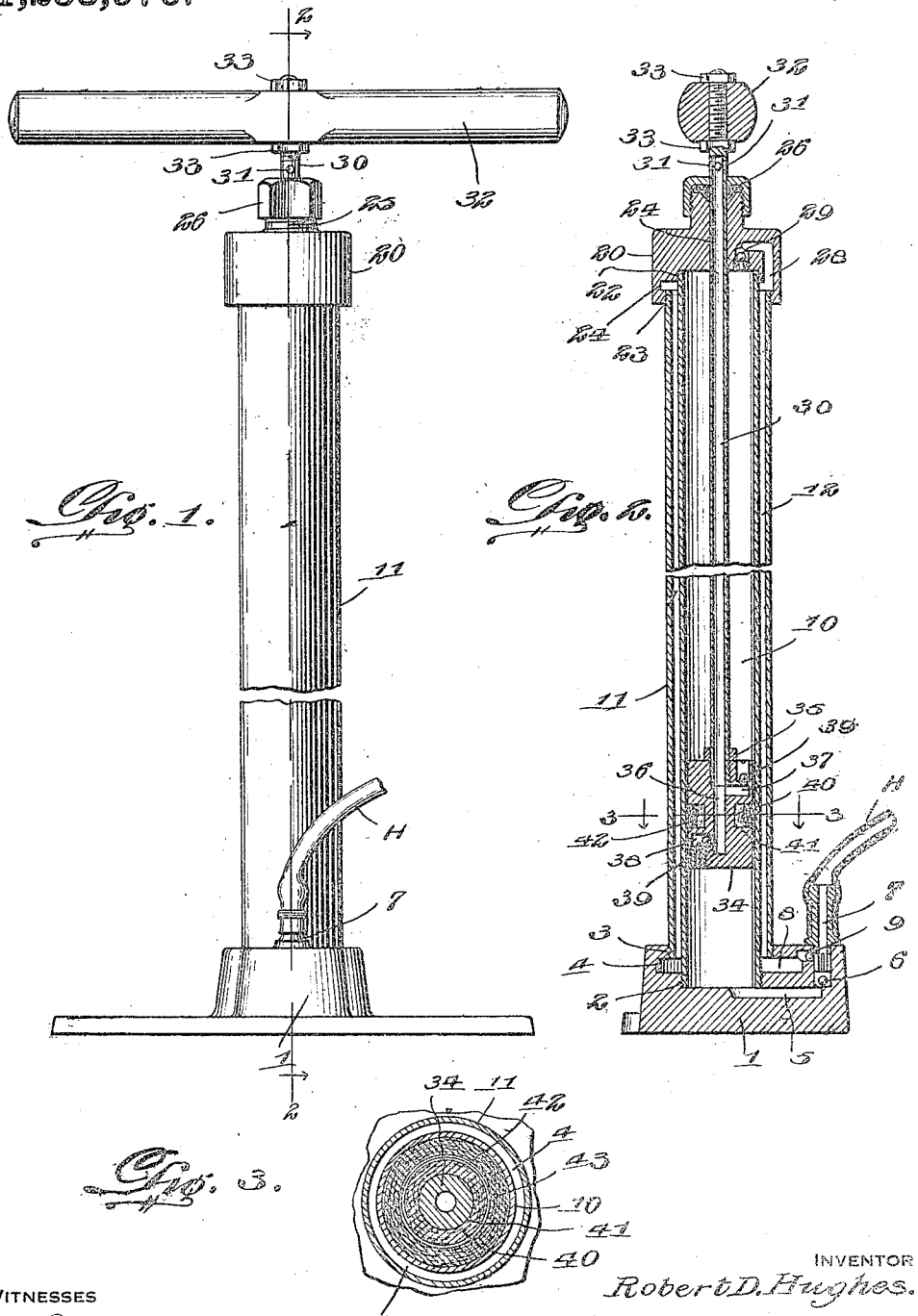

ROBERT D. HUGHES, OF LYNCHBURG, VIRGINIA, ASSIGNOR OF ONE-HALF TO JOSEPH R. BOWLES, OF LYNCHBURG, VIRGINIA.

DOUBLE-ACTING AIR-PUMP.

1,253,976.

Specification of Letters Patent.

Patented Jan. 15, 1918.

Application filed March 6, 1917. Serial No. 152,761.

*To all whom it may concern:*

Be it known that I, ROBERT D. HUGHES, a citizen of the United States, residing at Lynchburg, in the county of Campbell and State of Virginia, have invented new and useful Improvements in Double-Acting Air-Pumps, of which the following is a specification.

This invention relates to pumps, and more specially to those having a solid piston; and the object is to produce a pump whereby the air tubes in automobile tires or bicycle tires may be quickly inflated by reason of the fact that air is pumped into the tubes on both the upstroke and down stroke of the piston.

The invention consists in details hereinafter more fully described and claimed, and as shown in the drawings, wherein:—

Figure 1 is a side elevation of this pump complete.

Fig. 2 is a vertical section on the line 2—2 of Fig. 1.

Fig. 3 is a cross section on the line 3—3 of Fig. 2.

Referring to the drawings, the numeral 1 designates a metallic base bored with a socket 2 in its upper face and counterbored around the upper portion of the socket as at 3, and around the lower end of the counterbore is a channel 4. A port 5 leads from the bottom of the socket radially outward in the base, and upward through a downwardly closing check valve 6, to a nipple 7; and a second port 8 leads from the channel 4 through a downwardly closing check valve 9 into the same nipple. A flexible hose H is adapted to be slipped onto the latter and its other end will have a coupling which may be passed over the nipple in the tire to be inflated.

The barrel of this pump comprises two concentric tubular members slightly spaced. The inner member 10 may be called a cylinder, and its lower end is seated in the socket 2 of the base. The outer member 11 may be called a shell and its lower end is seated in the counterbore 3 of the base. An annular space 12 is left between these members, which communicates at its lower end with the channel 4 and connects through the port 8 with the nipple 7, whereas the interior of the cylinder communicates through the socket 2 and port 5 with the same nipple.

The cap or head 20 of the pump is bored with a socket 22 for the upper end of the cylinder, counterbored at 23 for the reception of the upper end of the shell, provided with a channel 24 communicating with the space 12, and has a port 28 connecting the channel through an upwardly closing check valve 29 with the interior of the cylinder. The said cap or head also has an axial bore 24 which extends through an upwardly projecting nipple 25, and onto the latter is screwed a cap nut 26 containing packing as best shown in Fig. 2.

The piston rod 30 is tubular and slidably mounted through the cap and the packing above it, is pierced above the same with air inlet holes 31, and carries at its upper end a handle 32 held rigidly between nuts 33. The lower end of the rod screws into a piston 34 fitting closely and slidably within the cylinder 10, and is held therein by a jam nut 35, and the bore of the rod communicates with a bore 36 within this piston. From the latter bore ports 37 and 38 open respectively through the upper and lower ends of the piston, and each is provided with a check valve 39 closing toward the socket.

As clearly seen in Fig. 3, I prefer to pack the piston between its ends so as to prevent leakage past it within the cylinder. This packing is composed of a band 40 of loose felt seated in the bottom of a channel 41 around the piston, an expanding leaf spring 42 surrounding and making more than one complete convolution around the felt, and a band of closely woven felt 43 around the spring and of sufficient thickness to be projected thereby normally beyond the periphery of the piston and into contact with the inner face of the wall of the cylinder 10. When a suitable lubricant is applied to one or both the bands of fabric or felt and they are thereby slightly expanded and their pores more or less filled, such expansion aided by the expansion of the spring, will throw the outer ring or band radially outward from the piston so as to make close contact with the cylinder. I do not wish to be limited, however, to this particular type of piston ring or packing. Nor is it essential how the head and base be mounted upon the extremities of the concentric cylinders, although doubtless the best construction would be to screw on the cap so that when necessary it could be removed for the complete separation of parts when desired.

The action of this pump will be as follows: When the operator grasps the handle 32 and raises the rod and piston, air trapped within the cylinder above the piston by the closure of the upward check valve 39, is driven past the valve 29 in the port 28, through the space 12 to the port 8, and past the valve 9 to and out the nipple 7. Meanwhile suction created beneath the piston by closure of the check valve 6 causes an inrush of air through the holes 39 and the bore of the piston rod, and past the lower check valve 39 within the port 38. As the rear of cylinder 10 is much greater than that of the bore of the piston, the air will flow in far more rapidly than the piston rises and therefore I would make the inlet holes 31 of ample size, and I locate them preferably below the handle where they are to an extent protected from becoming clogged with dirt or other extraneous matter which might be drawn to them by the suction set up, or which might lodge in them when the pump was laid aside.

On the downward movement of the handle and piston, the valve in the port 38 of the latter closes and the air trapped below the piston is driven out through the port 5 and past the check valve 6 to the nipple 7. Meanwhile the suction set up within the cylinder 10 above the piston by the closure of the check valve 29, causes the opening of the valve in the upper port 37 and again produces an inrush of air through the holes 31 and the bore of the piston rod, at a greater rate than the speed of descent of the piston. While I have shown the relative area of the bores of the cylinder and piston rod as considerably different, such difference is exagerated in the drawings for the sake of clearness, and doubtless the manufacturer will make the piston rod of considerable size, or at least somewhat larger than the rods usually employed in pumps of this character. My purpose has been to create a double acting pump that has as few working parts as possible, and wherein each reciprocatory movement of the piston in either direction drives a charge of air out the nipple to the point of use. The obvious purpose is to permit the autoist to pump his tire as rapidly as possible, because his labor is not wasted on the upstroke. While I do not wish to be limited in this respect, the base and cap of this pump may be cast or otherwise made of one piece each, whereas the barrel may well be made up of two tubes of light weight because they are rigidly held at both ends in the other members, preferably by being screwed into them as indicated. The shell 11 serves as a protector for the inclosed cylinder 10, and if rough usage should produce dents in the shell they will not interfere with the movement of the piston within the cylinder—a point of great advantage in automobile pumps. The annular space 12 between these members serves as a jacket so that the shell is cool at all times, no matter if rapid reciprocation of the piston should cause the heating of the cylinder.

What is claimed as new is:—

1. In a double acting pump, the combination with a barrel consisting of a cylinder and a shell inclosing it and producing an annular space, a base bored with a socket for the lower end of the cylinder and counter-bored to receive the lower end of the shell and provided with a channel around its counter-bore, an outlet nipple in the base, the latter having ports leading from said socket and channel to said nipple, independent check valves in said ports, a cap connecting the upper ends of the members of said barrel and having a port, and a check valve in said port closing toward the bore of the cylinder; of a tubular piston rod slidably mounted through said cap, a piston within the cylinder having a bore with which the bore of said rod communicates and ports leading from its bore upward and downward, and check valves in said ports.

2. In a double acting pump, the combination with a barrel consisting of a cylinder and a shell inclosing it and producing an annular space, a base bored with a socket for the lower end of the cylinder and counter-bored to receive the lower end of the shell and provided with a channel around its counter-bore, an outlet nipple in the base, the latter having ports leading from said socket and channel to said nipple, independent check valves to said ports, a cap bored in its lower face with a socket for receiving the upper end of the cylinder and counter-bored for receiving the upper end of the shell and also provided with a channel between said socket and counter-bore and with a port connecting the channel with the end of the socket, and a downwardly closing check valve within said port; of a tubular piston rod slidably mounted through said cap, a piston within the cylinder having a bore with which the bore of said rod communicates and ports leading from said piston-bore upward and downward, and check valves in said ports.

3. In a double acting pump, the combination with a barrel comprising a cylinder and a shell loosely surrounding and shorter than the same, a base in which the lower ends of said cylinder and shell are mounted and having ports leading from the space within the cylinder and the space between said members to a common outlet, independent check valves within said ports, a cap bored in its lower face with a socket for receiving the upper end of the cylinder and counterbored for receiving the upper end of the shell and also provided with a channel between said socket and counter-bore and with a port connecting the channel with the end of the socket, and a downwardly closing check valve within said port; of a tubular piston rod slidably mounted through said cap, a piston within the cylinder having a bore with which the bore of said rod communicates and ports leading from said piston-bore upward and downward, and check valves in said ports.

4. In a double acting pump, the combination with a barrel comprising a tubular cylinder and a tubular shell surrounding and shorter than the same to leave an annular space between such elements, a base having ports communicating with the spaces within the cylinder and between the elements and leading to a common outlet, check valves within said ports, a cap secured to the upper ends of said elements and having a port connecting the space within the cylinder with that between the elements, and a check valve within said port; of a nipple rising from the cap and containing packing, a tubular piston rod slidably mounted through said packing and cap and pierced near its upper end with inlet holes, a handle above said holes, a piston slidably mounted within the cylinder and having a bore into which the lower end of said rod is fastened and ports leading from said piston-bore upward and downward through the ends of the piston, and check valves within said ports.

In testimony whereof I affix my signature.

ROBERT D. HUGHES.

Witnesses:
N. L. COLLAMER,
K. A. MAHONEY.